United States Patent [19]

Schulzinger

[11] Patent Number: 5,556,555
[45] Date of Patent: Sep. 17, 1996

[54] METHOD AND APPARATUS FOR FILTERING USING FILTER MOUNTED ON TANK PARTITION WALL

[76] Inventor: Solomon Schulzinger, P.O. Box-4514, Richmond, Va. 23220

[21] Appl. No.: 375,610

[22] Filed: Jan. 20, 1995

[51] Int. Cl.⁶ .......................... B01D 37/00; B01D 35/027
[52] U.S. Cl. .......................... 210/767; 210/435; 210/456
[58] Field of Search .................. 210/348, 435, 210/445, 767, 497.01, 500.1, 800, 801, 521, 660, 663, 320, 451, 455, 456, 459

[56] References Cited

U.S. PATENT DOCUMENTS

| | | | |
|---|---|---|---|
| 264,314 | 9/1882 | Maynard | 210/445 |
| 293,519 | 2/1884 | Rich | 210/445 |
| 1,453,310 | 5/1923 | Engel | 210/435 |
| 1,460,867 | 7/1923 | Strowbridge | 210/435 |
| 2,143,044 | 1/1939 | Wicks et al. | 210/435 |

FOREIGN PATENT DOCUMENTS 9261 of 1901 United Kingdom ................ 210/500.1

*Primary Examiner*—Joseph W. Drodge

[57] ABSTRACT

A device useable, as a general purpose filter, for use with most kinds of liquids, is made up of a container divided into one tank for unfiltered liquids and another tank for filtered liquids by a partitioning wall that separates the tanks and supports a filtering fabric. The container rests on a stand having an upper level for holding the smaller unfiltered liquid tank and a lower level for holding the larger, filtered liquid tank. The filtering fabric is mounted to absorb the liquid and draw it up through the filter material such that it falls down on the opposite side and drips off into the filtered liquid tank.

2 Claims, 4 Drawing Sheets

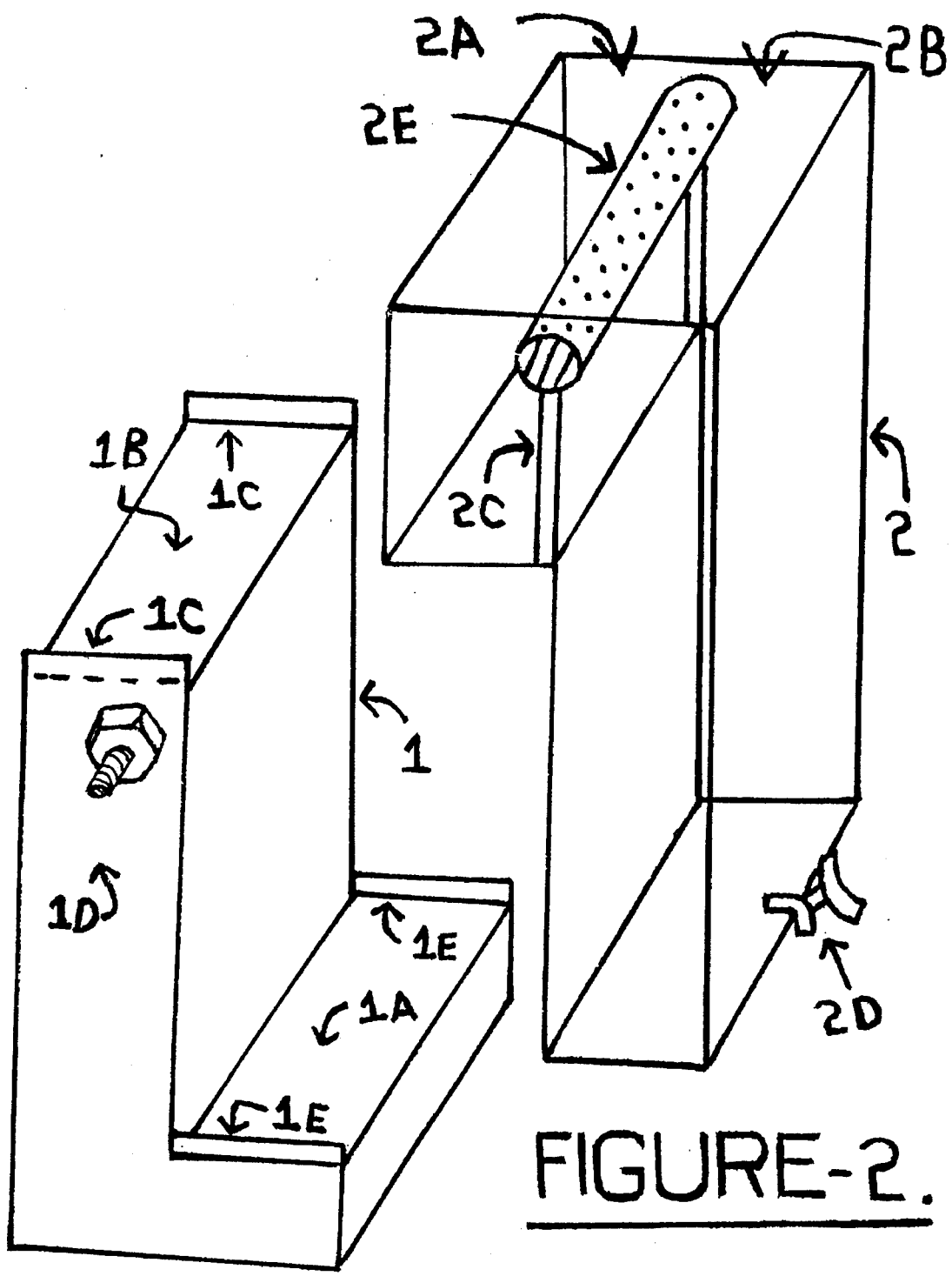

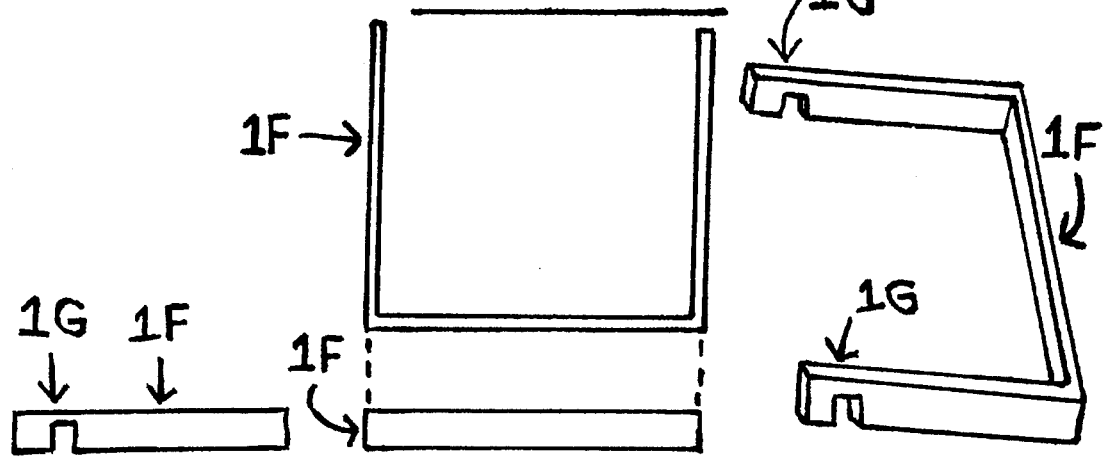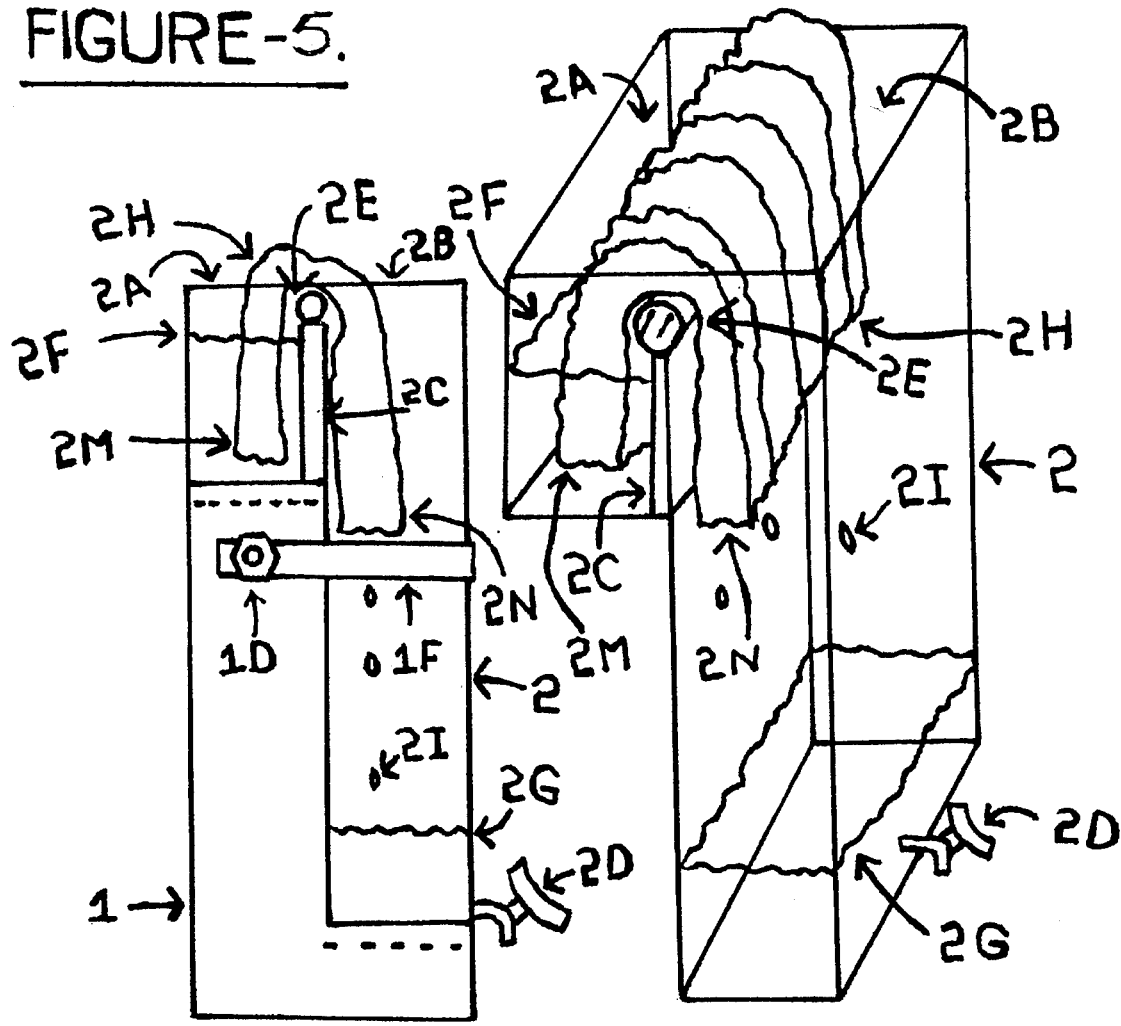

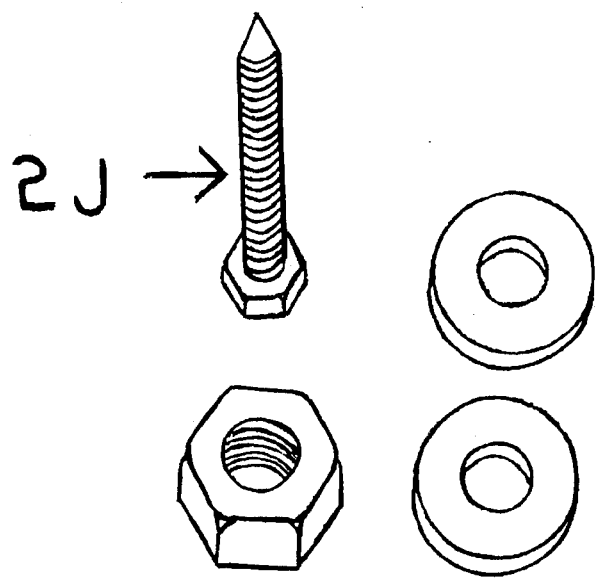
FIGURE-15.
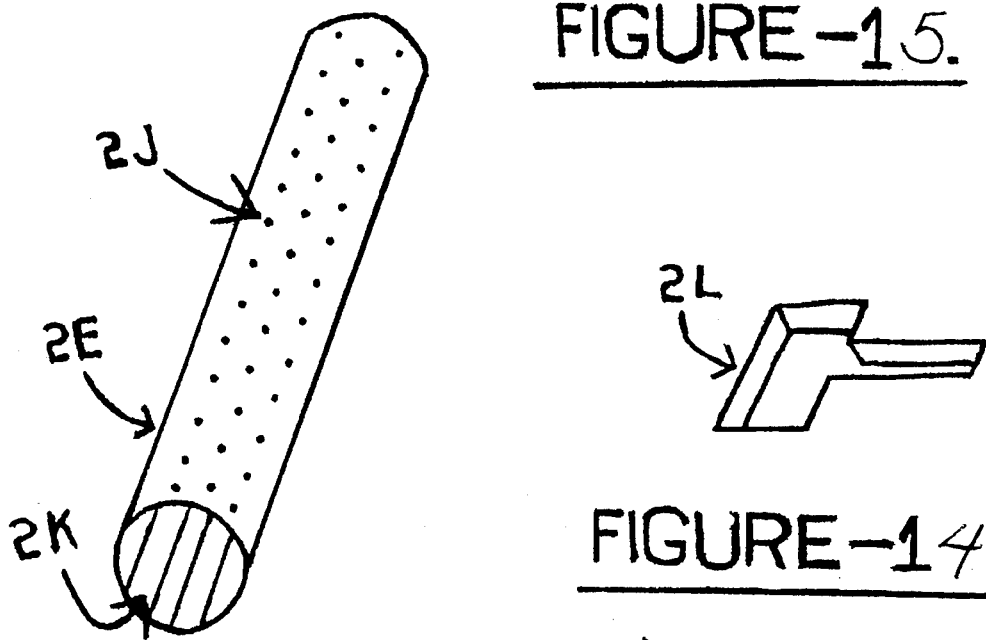
FIGURE-14.
FIGURE-12
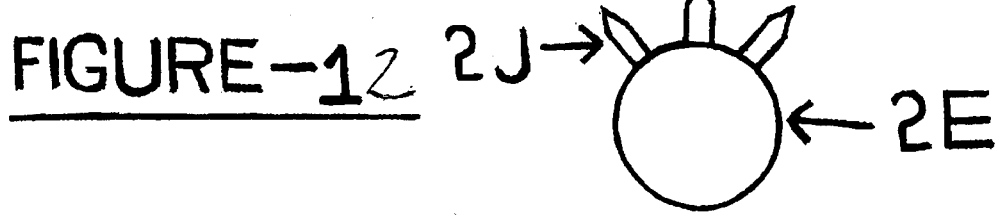
FIGURE-13

METHOD AND APPARATUS FOR FILTERING USING FILTER MOUNTED ON TANK PARTITION WALL

SUMMARY OF THE INVENTION

The invention relates to a method and apparatus of filtering utilizing a two level stand, a corresponding two level, open-topped container, each level forming a tank, the tanks being divided by a wall that supports a fabric filter. The apparatus is useful in a variety of filtering environments.

BACKGROUND OF THE INVENTION

Applicant is unaware of any related prior art.

BRIEF DESCRIPTION OF THE DRAWINGS

In the drawings:

ILLUSTRATION 1 is a view of a two level stand, a two tank container supportable by the stand and a fabric filter supported by the wall dividing the two tanks.

Figure 11:
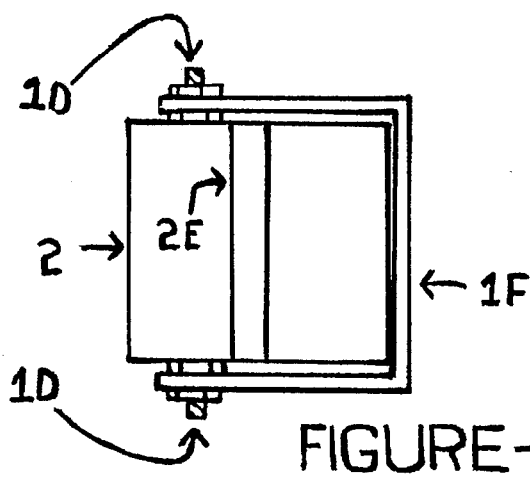
Figures 8, 9, 10:
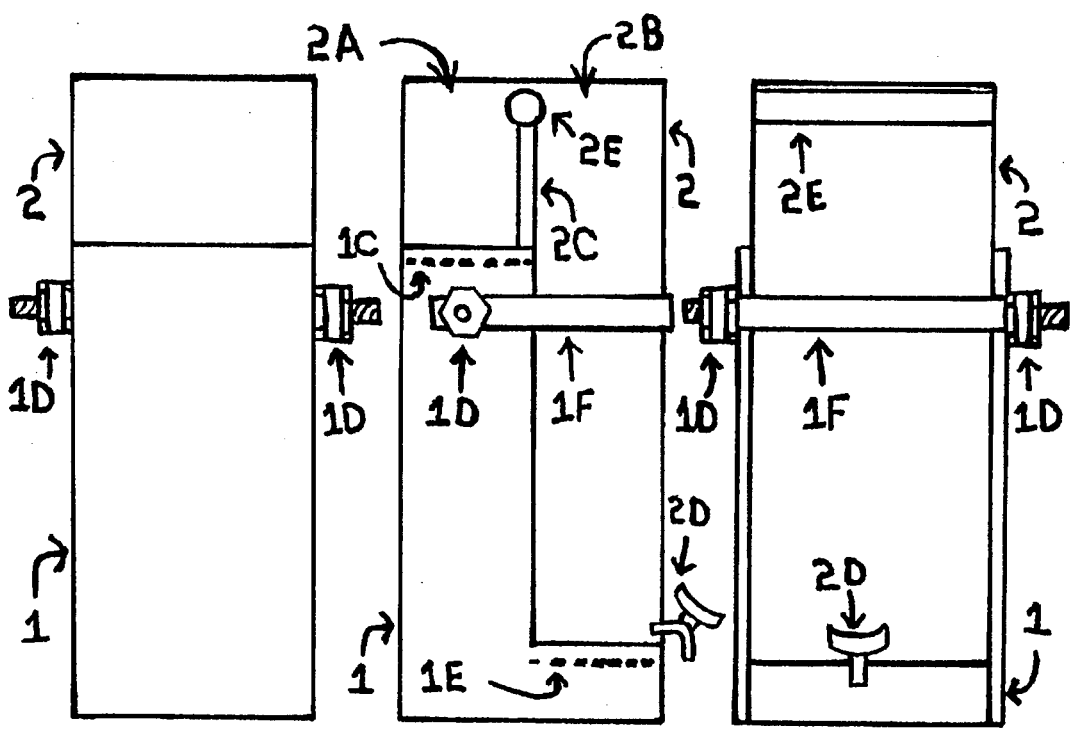

ILLUSTRATION 2 includes top back, side and front views of the stand and container.

ILLUSTRATION 3 includes side and angle views of the tank coupled to securing components, including the rack and actual filtering fabric in place.

ILLUSTRATION 4 includes top, side and angle views of securing parts.

ILLUSTRATION 5 includes angle and end views of a rack for holding filter material in place, a slot in the rack and bolts used in the rack to hold the filtering material in place.

ILLUSTRATION 6 shows details of bolts used to secure filter material to the rack.

ILLUSTRATIONS 7–15 show various end and side views of the tank, rack and securing parts and components.

DETAILED DESCRIPTION OF THE INVENTION

As shown in Illustrations 1–3, part 2 is a container for holding a fabric filter 2H that functions to filter by a combined absorbing, siphoning and gravity filtering action, defining a capillarity filtering action, held above the ground by part 1. Part 1 is a stand for container 2 to support the container and filter off the ground. The filtered liquids are removed from container 2 by means of faucet 2D.

The container 2 is secured and held in place to the stand by a three-sided bar 1F that extends around three sides of the container.

Illustration 1 shows the parts of stand 1. These include a bottom deck 1A on which the bottom of a lower section of part 2 is positioned, and a top deck 1B on which the bottom of a higher section of part 2 is positioned. The upper and lower sections of part 2, thus defined, are designated as tank 2A and 2B, respectively. Soft rubber sheeting or fabric material (not shown) can also be placed onto part 1B if, upon installation, it is found that there remains a space of, for example a quarter of an inch, between the bottom of tank 2A and top deck 1B.

The stand 1 also includes a number of securing parts. Side plates 1C, of the deck 1B are used to hold tank 2A in place and prevent tank 2A from getting dislodged to either side. Part 1F as also shown in Illustrations 4 and 6–8, having three sides, holds and secures the container to the stand by means of notches or cutouts 1G at the ends of part 1F, that secure part 1F to bolts 1D located at opposite ends of the stand, as best shown in Illustration 2.

Bolts 1D are held in place by nuts as shown in Illustrations 1, 9 and 10. Side plates or pieces 1E hold tank 2B in place and function in the same way as side plates 1C.

As shown in Illustrations 1–3 and 10 container 2 is made up of two tanks, as previously described. Unfiltered liquid can be poured into and contained in tank 2A, while the already filtered liquid, after passing through fabric filter 2H, is contained in tank 2B. A faucet 2D is coupled to tank 2B to allow dispensing of filtered liquid. Tanks 2A and 2B are divided by a partitioning wall 2C. Illustrations 5, 11 and 12 show typical levels of unfiltered and filtered liquid, 2F and 2G, in the tanks. The wall 2C holds and supports filter rack or holder 2E, around which, the filter 2H is wrapped. Holder 2E is in the shape of a tube, so as to allow a manual operation that allows one to secure the filter 2H to the holder through the use of stickers or sharp-pointed bolts 2J, also see Illustrations 5 and 6 that show how a plurality of the sharp pointed ends of the bolts extend through circumferentially and axially spaced holes in holder 2E away from the holder in all directions.

As best shown in Illustration 5, holder 2E contains a plurality of axially elongated slots 2K and 2L, parts 2L having both a wider part and a narrower part, to allow insertion of the bolts 2J from the topside of the holder. For uses where holder or tube 2E can be made wide enough for insertion of a hand, small holes can be substituted for the slots.

Illustrations 6 and 13–15 show details of the bolts 2J and accompanying components. Bolts 2J, in combination with semi-soft rubber washers 2J1 and 2J2 and nuts 2J3, secure the fabric filter 2H to the holder 2E. The bolts 2J are placed into the slots 24, with the washers placed onto the bolts so that the washers 2J1 and 2J2 are located inside and outside of the holder. The nuts 2J3 are then screwed onto the bolts and tightened so that the filtering material 2H is held in place without slipping off.

Again turning to Illustration 3, the filter 2H is shown mounted to and extending around tube 2E. The filter is generally and typically mounted so that its one end 2M hangs into the unfiltered liquid and is higher than the other end 2N, from which drops 2I, of filtered liquid, drip towards volume of filtered liquid 2G.

The apparatus is useful for filtering of many different kinds of liquids including different kinds of oils and industrial chemicals, fruit juices and other beverages, water and aqueous fluids and blood. The filter may be treated or untreated, and colored or uncolored towel fabric, woven towels or other cotton material and can be selected from different sizes. One limitation of the device is that shedding of the filter material may be a problem when handling certain fluids such as in filtering of milk.

With most applications, the filter works very well by absorbing the liquid through it so that it drops off into the tank 2B, while dirt or solids remain behind in tank 2A.

With regard to positioning of the filter in the tank, the type of liquid being filtered must be taken into considerations. For most applications, the part 2M of the filter (see Illustration 3) must be higher than part 2N for the device to function. However for certain fluids, such as in filtering very heavy grade oil, such as 80 viscosity, part 2M may be placed lower than the part 2N. For most applications, the filter 2H, must be located so that filtered liquid drips off.

With regard to the tank, it can be made either as one piece or as separate parts. The latter tank construction allows the filter to be periodically washed out. Usually a tank that is not too bulky works best.

I claim:

1. A method of filtering impurities from liquids comprising:

A) providing a stand having a first, elevated surface, and a second portion which is less elevated that the first surface;

B) providing a container to be supported by the stand, the tank having a vertical partitioning wall arranged such that the wall together with a first portion of the container defines boundaries of a first tank and the wall together with a second portion of the container define boundaries of a second tank, the tanks substantially resting on and supported by the respective surfaces of the stand;

C) securing a fabric filter on top of the wall;

D) introducing liquid into the first tank, and

E) removing filtered liquid from a faucet provided at the bottom of the second tank 1.

2. A filtering device comprising:

A) a stand having a first elevated, planar surface and a second, less elevated, planar surface;

B) a container constructed and arranged to be supported by the stand and having a vertical partitioning wall within arranged such that the wall together with a first portion of the container defines a first tank and the wall together with a second portion of the tank defines a second tank with the tanks substantially resting on and supported by the respective surfaces of the stand;

C) a faucet mounted to a bottom portion of the second tank, and

D) a fabric filter secured to the top of the partitioning wall.

* * * * *